United States Patent [19]

Makkink

[11] Patent Number: 5,359,948
[45] Date of Patent: Nov. 1, 1994

[54] SEED PLANTING DEVICE

[76] Inventor: Andrew E. Makkink, Doornbult, Sannieshof, Delareyville District, Transvaal Province, South Africa

[21] Appl. No.: 54,151

[22] Filed: Apr. 27, 1993

[30] Foreign Application Priority Data

Apr. 28, 1992 [ZA] South Africa ............... 92/3079

[51] Int. Cl.$^5$ ............................................. A01C 7/12
[52] U.S. Cl. ......................... 111/177; 111/89; 222/367
[58] Field of Search ................ 111/89, 90, 91, 128, 111/177; 221/277; 222/170, 367

[56] References Cited

U.S. PATENT DOCUMENTS

| 311,351 | 1/1985 | Meyer . | |
|---|---|---|---|
| 311,382 | 1/1985 | Sheldon . | |
| 1,462,847 | 7/1923 | Behrens . | |
| 2,340,240 | 1/1944 | White | 111/91 |
| 2,543,888 | 3/1951 | Bunch | 111/91 |
| 3,171,371 | 3/1965 | Gray et al. | 111/91 |
| 3,236,199 | 2/1966 | Gray et al. | 111/91 |
| 3,811,389 | 5/1974 | Rother | 111/91 |
| 3,815,524 | 6/1974 | Poll | 111/2 |
| 3,982,661 | 9/1976 | Feltrop | 111/91 X |
| 4,023,511 | 5/1977 | Newman | 111/89 |
| 4,181,241 | 1/1980 | Currah | 221/211 |
| 4,411,206 | 10/1983 | Hiscock | 111/34 |
| 4,444,130 | 4/1984 | Ray | 111/1 |

FOREIGN PATENT DOCUMENTS

| 60017 | of 1913 | Australia | 111/91 |
|---|---|---|---|
| 698467 | 1/1931 | France . | |
| 2327173 | 5/1977 | France . | |
| 334358 | 9/1930 | United Kingdom . | |
| 2003714 | 3/1979 | United Kingdom . | |
| 444514 | 11/1974 | U.S.S.R. | 111/89 |
| 533349 | 11/1976 | U.S.S.R. | 111/89 |

*Primary Examiner*—Randolph A. Reese
*Assistant Examiner*—John A. Ricci
*Attorney, Agent, or Firm*—Senniger, Powers, Leavitt & Roedel

[57] ABSTRACT

A seed planting device has a planting wheel rotatable about an axis 74 to roll over a land 38. Hollow tines 50 mounted at angular spacings on the wheel 22 extend outwardly. A seed cell 66 in each tine has an inlet 118 for receiving a seed and an outlet 69 towards an outer end. A seed dispensing mechanism 56 dispenses seeds individually to the seed cells via ducts 60. A release member 70 in each seed cell is movable between a retain condition for retaining a seed and a release condition for releasing the seed. Control for controlling the members 70 includes a control rotor 92 rotatable about an axis 94 parallel to and spaced from this axis 74 a predetermined amount in a predetermined direction, and link means linking each member 70 to a predetermined position on the rotor 92 such that the member is in its retain condition while the tine moves through angular positions approaching a position in which the tine penetrates the land 38, and such that the member is in its release condition when the tine is at its penetrating position.

17 Claims, 5 Drawing Sheets

SEED PLANTING DEVICE

SUMMARY OF THE INVENTION

This invention relates to a seed planting device.

In accordance with the invention, there is provided a seed planting device comprising a frame;

a planting wheel mounted on the frame for rotation about a planting wheel axis for rolling over an agricultural land in use;

a predetermined plurality of hollow tines mounted at predetermined angular spacings on the planting wheel to extend outwardly for cyclic penetration of a surface of the agricultural land in use;

a seed cell in each hollow tine and having an inlet for receiving a seed and an outlet towards an outer end of the respective tine for releasing the seed in use;

seed dispensing means mounted on the frame and adapted to dispense seeds individually to the respective seed cells;

a release member in each seed cell, which release member is movable between a retain condition in which it retains a seed in the seed cell and a release condition in which it releases the seed from the seed cell in use; and control means for controlling the respective release members respectively to retain and to release the respective seeds in response to angular positioning of the respective tines, the control means including a control rotor mounted on the frame about a control rotor axis which is parallel to the planting wheel axis and transversely spaced from the planting wheel axis a predetermined amount in a predetermined angular direction, link means linking each release member to a respective predetermined position on the control rotor such that the release member is in its retained condition while the respective tine moves through angular positions approaching but not yet at a penetrating angular position in which the tine penetrates the surface of the agricultural land in use, and such that the release member is in its release condition when the respective tine is at its soil penetrating angular position.

It is to be appreciated that this invention provides for control of the seed, in respect of time, until immediately before it is deposited into the ground, and, in respect of position, up to a position immediately upstream of the seed cell outlet which, at the point of releasing, is in close proximity to (in fact penetrated into) the soil where the seed is to be deposited. The Applicant believes that this will promote accuracy of planting and integrity of planting.

Each release member may be pivotal in its seed cell, the link means including a cranked lever for each release member.

Advantageously the arrangement of the control means may be such that the release members are held substantially irrotational in space, relative rotation between the release members and the respective seed cells being on account of the seed cells' rotating with the respective tines with the planting wheel in use. Each cranked lever may have first and second limbs which are off-set and parallel to each other, the first limb being pivotal relative to the respective seed cell and being irrotationally connected to the release member, the second limb being pivoted to the control rotor. The offset of the cranked lever and the spacing between the planting wheel axis and the control rotor axis may correspond. Generally, the angular direction of the spacing of the control rotor axis from the planting wheel axis may be substantially vertical when the seed planting device is in its operative orientation. It may be such that the control rotor axis is above the planting wheel axis.

However, by way of development the angular direction of the spacing of the control rotor axis from the planting wheel axis is adjustable. In practice, it will be adjusted about the position vertically above the planting wheel axis mentioned above. Adjustment will advance or retard displacing the release means from their retain conditions to their release conditions, ie it will advance or retard release of the seeds. Alternatively, readjustment can be used to fine tune the seed planting device in respect of seed size, eg for larger seeds, release will be advanced, and vice versa.

In a preferred embodiment, the tines may be removably mounted on the planting wheel to allow the number of tines on the planting wheel to be changed. Conveniently, the maximum number of tines on the planting wheel may be a number divisible by two and by three, ie 6, 12, or the like. This allows removal of alternate tines, or removal of two tines out of three, while still leaving the planting wheel symmetric.

Furthermore, each tine may be adjustably mounted on the planting wheel to allow adjustment of the spacing between the planting wheel axis and the outer extremity of the respective tine. Then, said respective predetermined position on the control rotor to which each respective release member is linked by means of the link means, may correspondingly be adjustable.

Yet further, the planting wheel may have an outer periphery which is adjustable to adjust the circumference of the planting wheel. The periphery of the planting wheel may thus be provided by a plurality of separate sectors, each sector being adjustable in respect of its radial position.

The above measures allow wide latitude in adjusting the spacing at which seeds are planted, and also the depth at which seeds as planted.

In one kind of embodiment, the seed dispensing means may be mounted in association with the planting wheel axis and may include a duct for each tine, each duct having an inlet at a position in the vicinity of the planting wheel axis and an outlet aligned with the inlet of a respective seed cell. To enhance the integrity of planting at high speed by allowing more time for a seed to move under gravity to the seed cell, the outlet of each duct may angularly be displaced from its inlet in a direction opposite to the operative direction of rotation of the planting wheel. The amount of angular displacement may be between about 30° and about 90°, conveniently about 70°.

In another kind of embodiment, the inlet of each seed cell may be radially outwardly exposed, the seed dispensing means having a dispensing outlet radially outside a pitch circle described by the inlets of the seed cells in use and arranged to dispense seeds downwardly under gravity into the respective seed cell inlets. The transport distance for the seeds is thus greatly reduced which allows even better for fast planting speeds.

BRIEF DESCRIPTION OF THE DRAWINGS

The invention is now described by way of example with reference to the accompanying diagrammatic drawings. In the drawings

DETAILED DESCRIPTION OF THE PREFERRED EMBODIMENT

Figure 1:
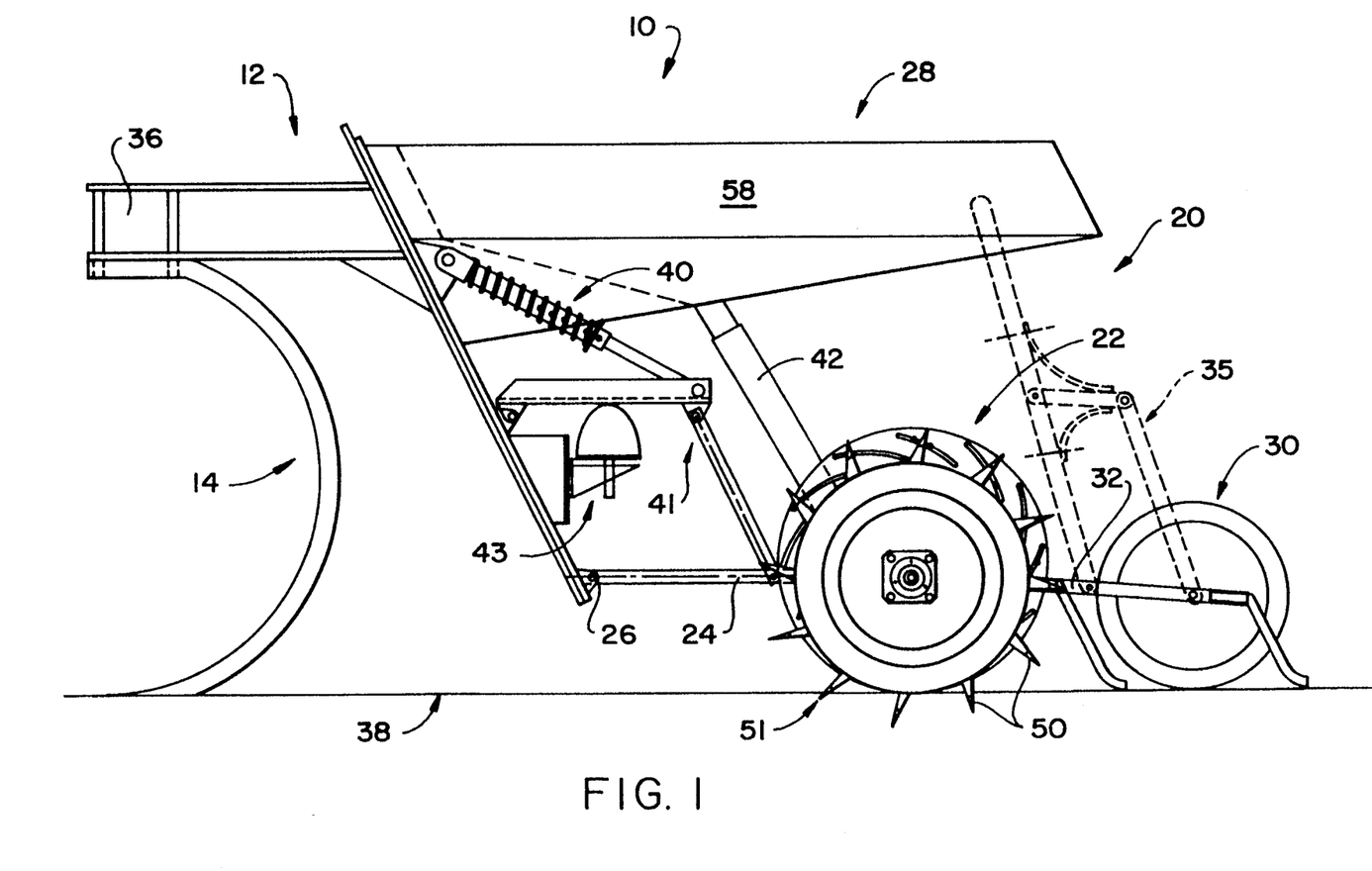
FIG. 1 shows in side view a seed planting device in accordance with the invention in use.

With reference to FIG. 1 of the drawings, a seed planter in accordance with the invention is generally indicated by reference numeral 10.

The planter 10 comprises a frame 12 on which is mounted one or more soil working tools, one of which is shown at 14.

Also mounted on the frame 12, is a seed planting device generally indicated by reference numeral 20. The seed planting device 20 comprises a seed container 28 mounted on the frame 12. It further comprises a planting wheel 22 mounted on a trailing arm arrangement 24 pivoted to the frame 12 as indicated at 26 at a lower end of an extension of the frame. The planting wheel 22 trails the soil working tools 14.

A trailing wheel 30 is mounted on secondary trailing arms 32 pivoted at a rear end of the trailing arm arrangement 24. The trailing wheel 30 trails the planting wheel 22. An alternative structure to suspend the trailing wheel 30 independently of the planting wheel 22 is shown in dotted outlines at 35. It can be applied in any convenient manner and is not described in detail.

The frame 12 comprises a transverse beam 36 which, in use, is hitched to an agricultural tractor via a three-point hitch thereof. A depth control mechanism of the tractor controls the level and orientation of the frame 12 relative to a soil level indicated by reference numeral 38. It is significant that the seed container 28, which is heavy especially when fully laden, is mounted directly on the frame 12 and is thus carried effectively by the tractor.

In another embodiment, the planter may be supported on wheels and may be adapted merely to be drawn by the tractor. Then, depth control will be via the wheels of the planter, and the mass of the seed container will be carried by such wheels.

In contrast, the planting wheel 22 is hinged via the trailing arm arrangement 24 to the frame 12 and rolls along the soil 38 without carrying additional weight. A parallelogram linkage 41 is utilized in conjunction with a spring 40 appropriately to suspend the planting wheel 22. In co-operation with the parallelogram linkage 41, stop means 43 is mounted on the frame extension resiliently to limit downward pivoting of the parallelogram linkage 41 and thus also of the planting wheel 22.

A plurality, in this case twelve, planting tines 50 are regularly spaced along the periphery of the planting wheel 22. Points of the tines 50 extend beyond the periphery of the planting wheel 22 to penetrate the soil 38 in use as shown at 51 and to form hollows in the soil 38.

Simultaneously with forming each hollow, the respective planting tine 50 releases a seed to fall into the hollow. The trailing wheel 30 closes each hollow by displacing soil laterally into the hollow over the seed.

The planting wheel 22 is rotatable on an axle 76 defining a planting wheel rotation axis 74 and is rotatably received in bushes or bearings (not shown) at the trailing end of the trailing arm arrangement 24.

Figure 2:
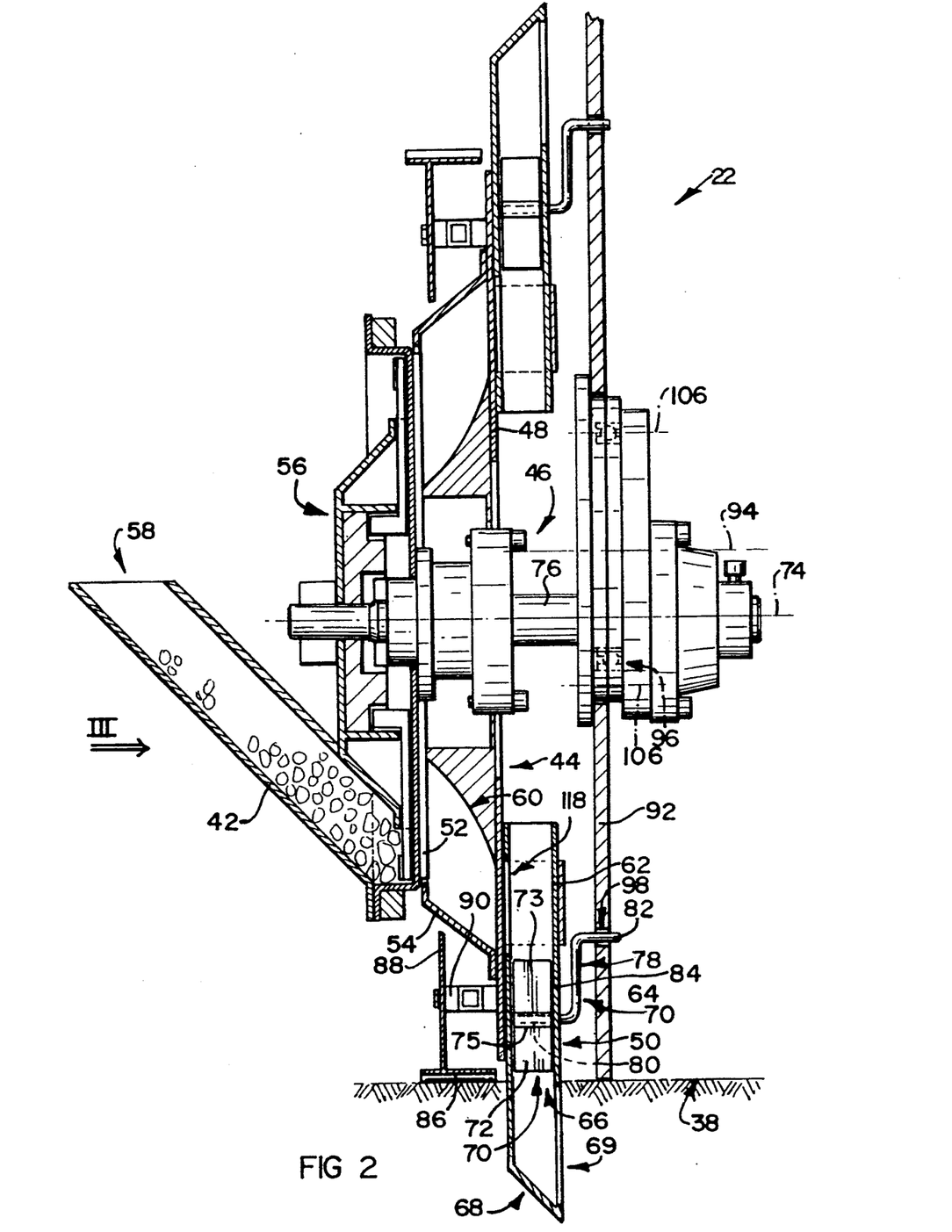
FIG. 2 shows, in axial section, to a larger scale, a planting wheel of the seed planting device.

With reference to FIG. 2 of the drawings, the planting wheel 22 is shown in fragmentary axial section.

The planting wheel 22 has a hub generally indicated by reference numeral 44 which is supported on a bearing arrangement generally indicated by reference numeral 46 on the axle 76 defining tile planting wheel rotary axis 74. Rotation of the planting wheel 22 about the axle 76 allows the planting wheel 22 to be rolled over the land surface 38.

The hub comprises opposed side plates 48, 52 in the form generally of discs. A periphery of the hub 44 is closed by means of a frustoconical peripheral ring 54.

Figure 3:
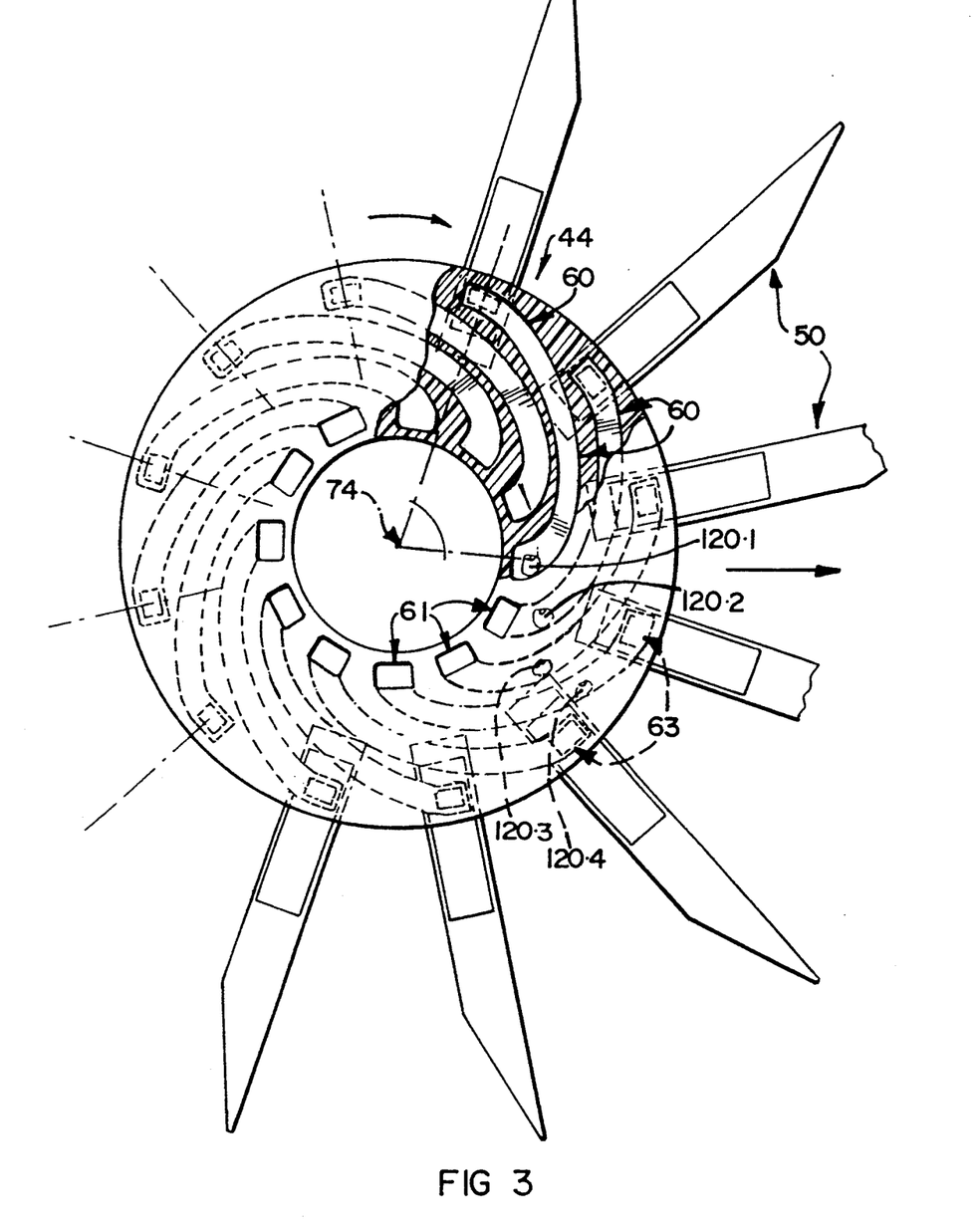
FIG. 3 shows a fragmentary side view along arrow III in FIG. 2, partially in section and with some components removed for ease of drawing.

Ducting 60 within the hub 44 is described with reference to FIG. 3 herein below.

A dispensing mechanism 56 is mounted on the axle 76 to be driven by the axle 76 in use. The dispensing mechanism 56 may be any appropriate conventional dispensing mechanism, such as a dispensing mechanism available from Deere and Company. It is adapted to dispense seeds individually in known manner and is not described herein. The dispensing mechanism 56 is fed in known manner from a buffer reservoir 58 which is filled via the conduit 42 shown in FIG. 1.

The planting tines 50 (twelve in number in this embodiment) are mounted generally peripherally on the hub 44 along the side plate 48. Each tine 50 includes a tube-like member 64 which is slidably received within a collar 62 fixed to the plate 48 and thus in turn to the hub 44. The position of the tube 64 within the collar 62 can be adjusted and can be locked in an adjusted position.

Each tine 50 defines an internal seed cell 66 which terminates in an exhaust port or outlet 69. Each tine 50 has a pointed outer end generally indicated by reference numeral 68 to facilitate penetration of the agricultural land surface 38.

A release member 70 is pivotal within the seed cell 66. The release member 70 comprises a pair of gates 72, 73 at a predetermined angle, generally at opposed sides of a central bush 75. The angle between the gates 72, 73 in this embodiment, is about 150°.

The release member 70, more specifically the bush 75, is fixed to a first limb 80 of a cranked lever generally indicated by reference numeral 78. The cranked lever 78 further has a second limb 82 parallel to and off-set from the first limb 80 by means of a crank arm 84 of predetermined length.

The planting wheel 22 has a rolling periphery provided by a plurality of tire sectors 86 mounted at radially outer ends of radial arms 88 slidably lockable in desirably adjusted radial positions in a bracket 90 mounted on the hub 44 and provided for the purpose of mounting the tire sections 86.

It is to be appreciated that the effective rolling diameter of the planting wheel 22 can be adjusted by appropriate adjustment of the positions of the tire sections 86. It is further to be appreciated that the tire sections 86 will in use roll over the land surface 38.

As mentioned above, the distance between the outer extremity 68 of each tine 50 and the planting wheel axis 74 can be adjusted by appropriate sliding of the tube 64 in the collar 62.

By means of the above adjustments, fine adjustment in the spacing at which seeds are planted and adjustment of the depth at which the seeds are planted can be effected. Course adjustment of the plant spacing can be effected by changing the number of tines 50, eg by removing some of the tines.

In accordance with the invention, the planting wheel 22 comprises control means for controlling retention and release of seeds in the seed cells 66. The cranked lever 78 forms part of the control means. The control means further includes a control rotor 92 mounted on the axle 76 by means of an asymmetric bearing 96 to be rotatable about a control rotor axis 94 which is parallel to and off-set from the planting wheel axis 74. In this embodiment, as will become apparent with reference to FIG. 4, the control rotor axis 94 is spaced directly above the planting wheel axis 74. Spacing is at a predetermined distance which corresponds also to the effective length of the crank arm 84 of the cranked lever 78.

Effectively a series of apertures in the form of a curved slot 98 is provided for each release means in circumferentially spaced arrangement through the control rotor 92. The second limbs 82 of the respective cranked levers 78 are pivoted within appropriately adjusted positions through the slots 98. The slots 98, as opposed to single apertures, accommodate adjustment in the positions of the tines 50 as mentioned above.

Control of the release member 70 of each tine is now described with reference to FIG. 4.

Figure 4:
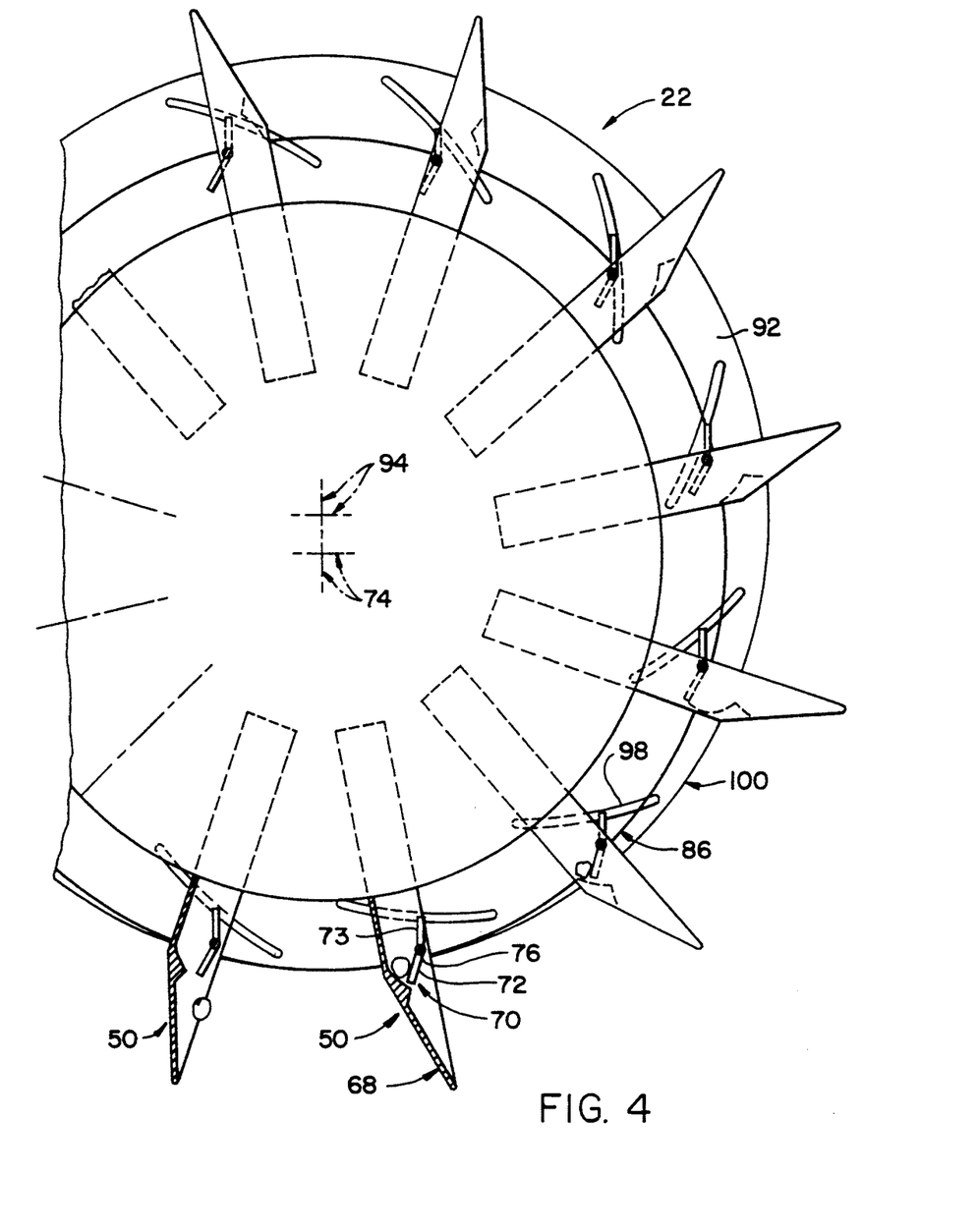
FIG. 4 shows, schematically in side view, the principle of operation of control means of the seen planting device.

The relative positions of the planting wheel axis 74 and the control rotor axis 94 can readily be perceived from FIG. 4. The general periphery 86 of the planting wheel is shown as well as a periphery 100 of the control rotor 92.

The tines 50 are shown mounted on the planting wheel 22, more specifically the hub 44, and their outer pointed ends are shown to project beyond the general periphery 86. Each tine 50 defines its seed cell 66 within which the release member 70 is pivoted about an axis defined by the bush 75 parallel to the axes 74, 94. The cranked levers 78, to which the respective release members 70 are fixed via their first limbs 80, are pivoted via the second limbs 82 in the apertures 98 through the control rotor 92.

The pivot axes 75 of the release members 70 are provided on a pitch circle 102 about the planting wheel axis 74. The pivot axes 82, 98 are provided on a pitch circle 104 about the control rotor axis 94.

It can be perceived from FIG. 4 that, when the planting wheel 22 rotates about the planting wheel axis 74, and the control rotor 92 rotates about the control rotor axis 94 in sympathy with the planting wheel, the release members 70 are held substantially irrotational in space. Thus, as the seed cells 66 rotate with the tines 50 together with the planting wheel 22, relative rotation of the release members 70 takes place with respect to the seed cells 66.

It is also shown, in respect of a specific tine more or less in the four o'clock to five o'clock position that the first gate 72 closes the outlet of the seed cell while the second gate 73 allows a seed to enter the seed cell 66 via an inlet toward a radially inner end thereof and to receive the seed within the included angle of about 150° intermediate the first and second gates 72, 73. As that specific tine approaches the six o'clock position in which it is fully penetrated into the soil 38, but before it reaches the six o'clock position, the first gate 72 continues to keep the outlet of the seed cell closed. However, when that specific tine substantially reaches its soil penetration position toward the six o'clock position, the first gate 72 moves past a step within the seed cell, and opens the outlet to allow the seed to fall under gravity out of the seed cell into the hollow formed by the tine in the soil. The tine rotates further with the seed cell 66 empty.

Ducting 60 is described with reference to FIG. 3. A duct 60 is provided for each tine 50. Each duct 60 extends in convoluted fashion from a position toward the planting wheel axis 74 to its associated tine. A lateral aperture or port 61 is provided at the upstream end of the duct arranged to receive seeds from the dispensing mechanism 56, when the aperture 61 is substantially at a three o'clock position.

It is to be appreciated that each duct 60 is curved in a direction opposite to the direction of rotation. Thus, when the duct 60 receives the seed with its upstream aperture 61 at the three o'clock position, the downstream end of the duct 60 is about the one o'clock position, ie about 70° displaced.

At the downstream end, the duct 60 has a lateral aperture or port 63 to exhaust the seed into the associated tine. The convoluted ducts allow extra time for the seeds to fall under gravity through the ducts as shown at 120.1, 120.2, 120.3 and 120.4 for successive ducts.

Figure 5:
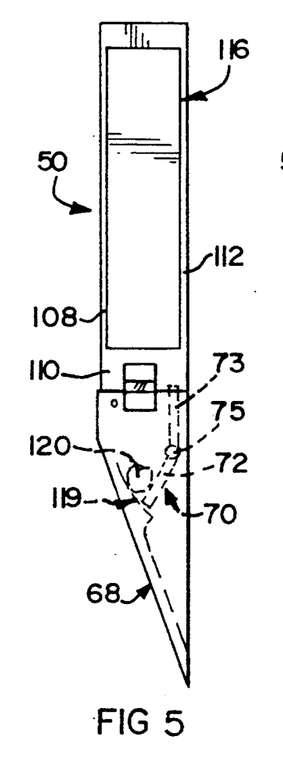
FIGS. 5, 6 and 7 show, respectively in side view, rear view and three dimensional view, to a larger scale, a hollow tine of the seed planting device.
Figure 6:
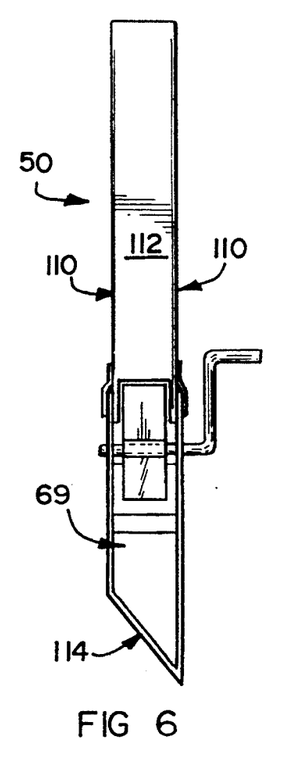
Figure 7:
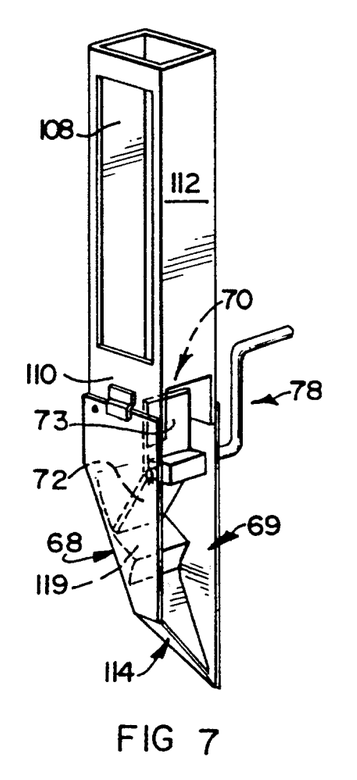

With reference to FIGS. 5, 6 and 7, each tine 50 is of generally tubular construction comprising a leading wall 108, a trailing wall 112, and side walls 110. The leading wall 108, toward an outer end of the tine 50, is oblique to form the pointed outer end 68. Also the one side wall 110 slants toward the outer end of the tine 50 as shown at 114 to enhance the pointed effect.

An inlet 116 is formed in an upper portion of the wall 110. The inlet 110 is aligned with the outlet 63 of its associated duct 60 to receive a seed. The inlet 116 leads into the seed cell 66.

An outlet 69 is formed in a lower portion of the trailing wall 112 to release a seed into the soil in use.

A slide surface or floor 119 is formed in the seed cell 66. The surface 119 is generally concentric with the bush 75 defining a pivot axis for the release member 70. This allows the .gate 72 to move with little clearance along the surface 119 to retain a seed 120. The surface 119 terminates in a step to allow a gap to form suddenly rather than gradually when the gate 72 moves past. This promotes accuracy in releasing the seed 120 in respect of time and position and which is not influenced unduly by variation in seed size.

Figure 8:
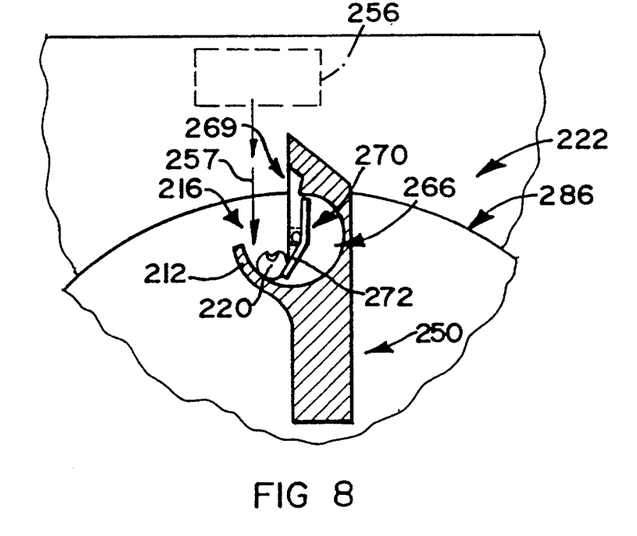
FIG. 8 shows, schematically in side view, another embodiment of seed dispensing means of the seed planting device.

With reference to FIG. 8, another arrangement of dispensing means is illustrated.

A displacing mechanism 256 is arranged at an elevated position, for example at about the twelve o'clock position, relative to the planting wheel 222. The dispensing mechanism 256 dispenses seeds 220 downwardly under gravity as shown at 257 from an outer position generally radially outward of the planting wheel periphery 286, or a pitch circle formed by inlets 216 (see below) to the seed cells. This is in contrast to the inner positioning toward the planting wheel axis 74 as shown in FIG. 2 of the dispensing mechanism 56.

A modified tine 250 has a seed cell 266 which is radially inwardly closed. The seed cell 266 is partially round having a lip 212 extending laterally and radially outwardly to form an inlet or mouth 216 which is radially outwardly disposed to accept the seed 220.

The release member 270 operates similarly to the release member 70 described above.

If desired the tine 250 may be allowed to advance in a clockwise direction somewhat further to about the one or two o'clock position before accepting the seed. The positioning and timing of the dispensing mechanism will be modified correspondingly.

The embodiment of FIG. 8 has the additional advantage that the distance through which the seed has to travel to the seed cell is reduced, thus making higher planting speeds possible relative to the embodiment of FIG. 2.

This invention has a large number of advantages over conventional planting devices known to the Applicant.

It is an advantage of the control means utilizing the control rotor that the orientation of the release members 70 is positively maintained in space during operation of the planter 10.

It is regarded as a general advantage of the seed planting device 20 that a lightweight, compact, inexpensive planting unit is provided which is expected to plant seeds very accurately. It is also an advantage that merely hollows are formed in the soil 38 as opposed to furrows drawn through the soil as in other planters known to the Applicant.

By way of further development, the effective diameter of the planting wheel 22—as dictated by the radial position of the tread 86—can be adjusted. This will allow adjustment of the spacing between hollows and thus also of the spacing between plants.

Advantageously, the extent to which the tines 50 project beyond the tread 86 can be adjusted. This is particularly advantageous bearing in mind the adjustability of the effective diameter of the planting wheel 22. This can, for example, be effected by having the points of the tines 50 separate from the rest of the planting tines and replaceable by longer or shorter points, alternative to, or in addition to having the tines 50 slidably mounted as described.

If desired, some tines (eg alternate tines) can be rendered inoperative, eg by blanking off or filling up of alternate sockets in the dispensing means. The points of those inoperative tines can advantageously also be removed. In this fashion, gross adjustment in the planting spacing can be effected. For example, if the planting wheel is designed to plant sunflower, such rendering inoperative of alternate planting tines will convert the planting wheel to a condition suitable to plant maize (corn).

Thus, it is to be appreciated that a suitable combination of gross adjustment (by rendering selected planting tines inoperative) and fine adjustment (by adjusting the effective diameter of the planting wheel), allows stepless or virtually stepless adjustment over a wide range.

It is further an advantage that the planting depth can be adjusted as described.

It is a yet further advantage that the planter 10, especially when it incorporates the embodiment of dispensing means of FIG. 8, can achieve high planting speeds.

It is also an advantage that the planter is merely rolled over a land in use and that merely hollows are formed for planting. It is expected that relatively little tractive effort will be required to operate the planter. Furthermore, soil disturbance will be little.

The concept of the planting wheel mounted on a frame renders the planting wheel very versatile. It can be used in single format in very simple and modest planting operations. It can also be used in large, sophisticated planting operations utilizing multi-rows and high planting speeds.

A further advantage of the planting wheel will make it possible to penetrate stubble or plant residues left on the soil through minimum tillage cultivation practices, and place the seeds in the soil.

The planting wheel can be used with a large variety of seeds in respect of size and also size variation in a single batch.

What is claimed is:

1. A seed planting device comprising
   a frame;
   a planting wheel mounted on the frame for rotation about a planting wheel axis for rolling over an agricultural land in use;
   a predetermined plurality of hollow tines mounted at predetermined angular spacings on the planting wheel to extend outwardly for cyclic penetration of a surface of the agricultural land in use;
   a seed cell in each hollow tine and having an inlet for receiving a seed and an outlet towards an outer end of the respective tine for releasing the seed in use;
   seed dispensing means mounted on the frame and adapted to dispense seeds individually to the respective seed cells;
   a release member in each seed cell, which release member is movable between a retain condition in which it retains a seed in the seed cell and a release condition in which it releases the seed from the seed cell in use; and
   control means for controlling the respective release members respectively to retain and to release the respective seeds in response to angular positioning of the respective tines, the control means including
   a control rotor mounted on the frame about a control rotor axis which is parallel to the planting wheel axis and transversely spaced from the planting wheel axis a predetermined amount in a predetermined angular direction,
   link means linking each release member to a respective predetermined position on the control rotor such that the release member is in its retain condition while the respective tine moves through angular positions approaching but not yet at a penetrating angular position in which the tine penetrates the surface of the agricultural land in use, and such that the release member is in its release condition when the respective tine is at its soil penetrating angular position.

2. A seed planting device as claimed in claim 1, in which each release member is pivotal in its seed cell, the link means including a cranked lever for each release member.

3. A seed planting device as claimed in claim 2, in which the arrangement of the control means is such that the release members are held substantially irrotational in space, relative rotation between the release members and the respective seed cells being on account of the seed cells' rotating with the respective tines with the planting wheel in use.

4. A seed planting device as claimed in claim 2, in which each cranked lever has first and second limbs which are off-set and parallel to each other, the first limb being pivotal relative to the respective seed cell and being irrotationally connected to the release member, the second limb being pivoted to the control rotor.

5. A seed planting device as claimed in claim 4, in which the off-set of the cranked lever and the spacing between the planting wheel axis and the control rotor axis correspond.

6. A seed planting device as claimed in claim 1, in which the angular direction of the spacing of the control rotor axis from the planting wheel axis is substantially vertical when the seed planting device is in its operative orientation.

7. A seed planting device as claimed in claim 1, in which the angular direction of the spacing of the control rotor axis from the planting wheel axis is adjustable.

8. A seed planting device as claimed in claim 1, in which the tines are removably mounted on the planting wheel to allow the number of tines on the planting wheel to be changed.

9. A seed planting device as claimed in claim 8, in which the maximum number of tines on the planting wheel is a number divisible by two and by three.

10. A seed planting device as claimed in claim 1, in which each tine is adjustably mounted on the planting wheel to allow adjustment of the spacing between the planting wheel axis and the outer extremity of the respective tine.

11. A seed planting device as claimed in claim 10, in which said respective predetermined position on the control rotor to which each respective release member is linked by means of the link means, is correspondingly adjustable.

12. A seed planting device as claimed in claim 1, in which the planting wheel has an outer periphery which is adjustable to adjust the circumference of the planting wheel.

13. A seed planting device as claimed in claim 12 in which the periphery of the planting wheel is provided by a plurality of separate sectors, each sector being adjustable in respect of its radial position.

14. A seed planting device as claimed in claim 1, in which the seed dispensing means is mounted in association with the planting wheel axis and includes a duct for each tine, each duct having an inlet at a position toward the planting wheel axis and an outlet aligned with the inlet of a respective seed cell.

15. A seed planting device as claimed in claim 14, in which the outlet of each duct is angularly displaced from its inlet in a direction opposite to the operative direction of rotation of the planting wheel.

16. A seed planting device as claimed in claim 15, in which the amount of angular displacement is between about 30° and about 90°.

17. A seed planting device as claimed in claim 1, in which the inlet of each seed cell is radially outwardly exposed, the seed dispensing means having a dispensing outlet radially outside a pitch circle described by the inlets of the seed cells in use and arranged to dispense seeds downwardly under gravity into the respective seed cell inlets.

* * * * *